United States Patent [19] [11] Patent Number: 4,812,522
Handlin, Jr. [45] Date of Patent: Mar. 14, 1989

[54] MOLECULARLY MISCIBLE BLENDS OF POLYKETONE WITH POLYVINYL PHENOL

[75] Inventor: Dale L. Handlin, Jr., Houston, Tex.

[73] Assignee: Shell Oil Company, Houston, Tex.

[21] Appl. No.: 129,124

[22] Filed: Dec. 4, 1987

[51] Int. Cl.$^4$ .................... C08L 23/08; C08L 25/08; C08L 25/18

[52] U.S. Cl. ................... 525/153; 525/185; 525/219

[58] Field of Search ................. 525/153, 219, 185

[56] References Cited

U.S. PATENT DOCUMENTS

| | | | |
|---|---|---|---|
| 2,495,286 | 1/1950 | Brubaker | 260/63 |
| 3,689,460 | 9/1972 | Nozaki | 260/63 |
| 3,694,412 | 9/1972 | Nozaki | 260/63 |
| 3,860,538 | 1/1975 | Guillet et al. | 525/214 |
| 3,914,391 | 10/1975 | Nozaki | 423/364 |
| 3,968,082 | 7/1976 | Hudgin | 504/302 |
| 4,640,937 | 2/1987 | Hanyuda | 522/31 |
| 4,714,711 | 12/1987 | Baldoff et al. | 525/185 |

FOREIGN PATENT DOCUMENTS

| | | |
|---|---|---|
| 0121965 | 10/1984 | European Pat. Off. |
| 0138609 | 4/1985 | European Pat. Off. |
| 3246106 | 12/1982 | Fed. Rep. of Germany |
| 066291 | 12/1974 | Japan |
| 066337 | 12/1974 | Japan |
| 008671 | 2/1976 | Japan |
| 029397 | 8/1976 | Japan |
| 021437 | 7/1978 | Japan |
| 136904 | 2/1981 | Japan |
| 152530 | 1/1984 | Japan |
| 053318 | 8/1984 | Japan |
| 064726 | 9/1984 | Japan |
| 076541 | 9/1984 | Japan |
| 1081304 | 3/1965 | United Kingdom |

OTHER PUBLICATIONS

"Novel Palladium (II)-Catalyzed Copolymerization of Carbon Monoxide with Olefins", J. Am. Soc., 1982, 104, 3520-3522.

Primary Examiner—Allan M. Lieberman
Attorney, Agent, or Firm—Wendy K. B. Buskop

[57] ABSTRACT

A molecularly miscible blend of a linear alternating polymer of carbon monoxide and an ethylenically unsaturated hydrocarbon and a polyvinyl phenol.

8 Claims, No Drawings

MOLECULARLY MISCIBLE BLENDS OF POLYKETONE WITH POLYVINYL PHENOL

BACKGROUND OF THE INVENTION

This invention is concerned with molecularly miscible blends of polyvinyl phenol and polyketone polymers.

The general class of polymers of carbon monoxide and one or more ethylenically unsaturated hydrocarbons has been known for some years. Brubaker, U.S. Pat. No. 2,495,286, produced such polymers of relatively low carbon monoxide content in the presence of free radical catalysts such as benzoyl peroxide. British Pat. No. 1,081,304 produced such polymers of higher carbon monoxide content in the presence of alkylphosphine complexes of palladium as catalyst. Nozaki extended the process to arylphosphine complexes of palladium. See, for example, U.S. Pat. No. 3,694,412.

More recently, the class of linear alternating polymers of carbon monoxide and unsaturated hydrocarbons, now known as polyketones, has become of greater interest, in part because of improved methods of production. Such methods are shown by European Patent Applications Nos. 0,181,014 and 0,121,965. The disclosed processes employ, inter alia, a compound of a Group VIII metal such as palladium, an anion of a non-hydrohalogenic acid having a pKa below 2 and a bidentate ligand of phosphorus. The resulting polymers are generally high molecular weight thermoplastic polymers having utility in the production of articles such as containers for food and drink and parts for the automotive industry or structural members for use in the construction industry.

U.S. Pat. No. 3,689,460 and 3,694,412 disclose two other processes for preparing polyketones. The catalysts described therein are complexes of a palladium, chloride or allyl palladium chloride and two trihydrocarbyl phosphine monodentate-like ligands, such as triphenylphosphine.

Another process for preparing polyketones is discussed by Sen and Li in an article entitled "Novel Palladium (II)—Catalyzed Copolymerization of Carbon Monoxide With Olefins", J. Am Chem. Soc. 1982, 104, 3520-3522. This process generates higher yield than the other disclosed processes.

The process for preparing polyketones of European Patent Application 0121965 is directed towards a preparation of polyketones to obtain a high yield, wherein a mixture of carbon monoxide and alkenically unsaturated hydrocarbon is polymerized in the presence of a Group VIII metal catalyst containing ligands, wherein hydrocarbon groups are bonded to an element from Group Va, characterized in that, as catalyst, a complex compound is used that is obtained by reacting a palladium, cobalt or nickel compound, a bidentate ligand of the general formula:

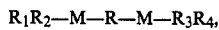

$$R_1R_2-M-R-M-R_3R_4,$$

in which M represents phosphorous, arsenic or antimony, $R_1$, $R_2$, $R_3$, and $R_4$ are identical or different hydrocarbon groups, and R represents a divalent organic bridging group having at least two carbon atoms in the bridge, none of these carbon atoms carrying substituents that may cause stearic hinderance, and an anion of an acid with a pKa of less than two, provided the acid is neither a hydrohalogenic acid nor a carboxylic acid.

Even though there have been disclosed numerous processes for preparing polyketones, the polyketones have generally not been blended with other substances to form molecularly miscible blends.

It has been long desired to provide molecularly miscible blends of polyketones and other polymers.

It has been desired to provide miscible blends of polyketones with a variety of substances to result in new miscible blends with good creep and modulus.

SUMMARY OF THE INVENTION

A molecularly miscible blend of a linear alternating polymer of carbon monoxide and an ethylenically unsaturated hydrocarbon with a polyvinyl phenol.

DETAILED DESCRIPTION OF THE INVENTION

Preferred polyketone polymers usable to prepare these unique molecularly miscible blends are copolymers of carbon monoxide and ethylene or terpolymers of carbon monoxide, ethylene and a second aliphatic α-olefin of 3 or more carbon atoms, particularly propylene.

Such polymers can be typically produced by contacting the carbon monoxide and the ethylenically unsaturated hydrocarbon(s) under polymerization conditions in the presence of a catalystic amount of a catalyst formed from a compound of the Group VIII metals palladium, cobalt or nickel, the anion of a non-hydrohalogenic acid of a pKa less than about 6, preferably less than about 2, and a bidentate ligand of phosphorus, arsenic or antimony. Although the scope of the polymerization is extensive, for purpose of illustration a preferred Group VIII metal compound is palladium acetate, the anion is the anion of an acid selected from trifluoroacetic acid and para-toluenesulfonic acid and the bidentate ligand is selected from 1,3-bis(diphenylphosphino)propane and 1,3-bis[di(2-methoxyphenyl)-phosphino]propane.

Polymerization is carried out at polymerization conditions, typically at elevated temperature and pressure, in the gaseous phase or in the liquid phase in the presence of an inert diluent, e.g., a lower alcohol such as methanol or ethanol. The reactants are contacted by conventional methods such as stirring or shaking and subsequent to reaction the polymer product is recovered as by decantation or filtration. The polymer product may contain metallic residues from the catalyst which are removed by contact with a solvent which is selective for the residues. Production of these polymers is illustrated, for example, by published European Patent Applications Nos. 0,181,014 and 0,121,965.

The physical properties of the polyketone polymer usable in the molecularly miscible blends will be determined in part by the molecular weight and by whether the polymer is a copolymer or a terpolymer. Typical melting points are from about 175° C. to about 300° C., more typically from about 210° C. to about 280° C. Polyketone polymers usable herein have preferred melting points of between about 196°-225° C. though polymers with melting points ranging from about 180° to about 280° C., such as 260° C., may be usable herein.

The structure of the preferred polymers is that of a linear alternating polymer of carbon monoxide, ethylene and any second ethylenically unsaturated hydrocarbon. When terpolymers of carbon monoxide, ethylene and a second ethylenically unsaturated hydrocarbon, e.g., a hydrocarbon of at least 3 carbon atoms, are produced, there will be at least two units incorporating moieties of ethylene per unit incorporating a moiety of the second unsaturated hydrocarbon, preferably from about 10 units to about 100 units incorporating moieties of ethylene per unit incorporating a moiety of the second unsaturated hydrocarbon. The polymer chain of the preferred class of polymers is illustrated by the formula

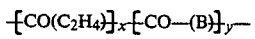

wherein B is the moiety obtained by polymerization of the second ethylenically unsaturated hydrocarbon through the ethylenic unsaturation. The $-CO(C_2H_4)-$ units and the $-C(B)-$ units occur randomly throughout the polymer molecule and the ratio of y:x is no more than about 0.5. In the modification of the invention which employs copolymers of carbon monoxide and ethylene without the presence of a second ethylenically unsaturated hydrocarbon, the term $y=0$ and the ratio of y:x is also 0. When terpolymers are employed, i.e., y is greater than 0, ratios of y:x from about 0.01 to about 0.1 are preferred. The end groups or "caps" of the polymer chain will depend on the particular materials present during its production and whether and how the polymer has been purified. The precise nature of the end groups is of little significance with regard to the overall properties of the polymer so that the polymer is fairly represented by the polymer chain as depicted above.

Useful polyketones for molecularly miscible blends have limiting viscosity numbers (LVN) as measured by the method wherein the polymer is dissolved in meta-cresol at 60° C., using a standard capillary viscosity measuring device, such as a Cannon-Ubbelohde viscometer in the range of 0.5 to 10 LVN and more preferably 0.8 to 4 LVN and most preferably 0.8 to 2.5 LVN.

Polyketone powders usable to make the inventive molecularly miscible blends contain a percent a crystallinity range from about 25% to about 80% crystallinity and more preferably from about 30% to about 50% and most preferably about 40% crystallinity as determined by the following formula using the heat of fusion value "HF" (expressed in cal/grams) as determined from a DSC (Differential Scanning Calorimeter) testing unit described hereinafter.

$$\% \text{ crystallinity} = \frac{HF}{55 \text{ cal/gram}} \text{ (theoretical heat of fusion for 100\% crystalline polyketone)}$$

Molecularly miscible blends are herein defined as blends, which, although they can be separately by conventional techniques, during other forms of testing, the blend only presents one value. More specifically, molecularly miscible blends present one glass transition temperature (Tg) as measured by Dynamic Mechanical Analysis (DMTA - wherein the polymers are vibrated to detect changes in the modulus of the polymer blend with temperature). Large scale phase separation does not occur with the molecularly miscible blends.

For polyketone blends, two types of blending can occur. "Completely amorphous" polyketone blending can occur, wherein neither component crystallizes and the substances exist in a one-phase, molecularly mixed system. "Semicrystalline" polyketone blending can occur if some crystallinity occurs in one or more components of the polyketone blend while maintaining a blend of the amorphous phases of the components.

It has been found in accordance with the instant invention that the desired molecularly miscible blends can be obtained by blending together a compatible mixture of (a) a polyketone copolymer such as one of the types described above, with (b) a polymer capable of hydrogen bonding with the polyketone, that is, a polyvinyl phenol, and wherein components (a) and (b) are blended in relative proportions by weight within a range of from 1:99 to 99:1 parts based on 100 parts of (a) and (b) combined.

The most preferred molecular miscible polyketone blend is based on 100 parts of a combined mixture of (a) and (b) prepared from about 80 to 20 parts of (a) and, correspondingly, from about 20 to 80 parts of (b). Blends of components (a) and (b) which are also usable can range in relative proportions from about 40:60 to 60:40, or be, approximately equal proportions by weight, i.e. (a):(b)=50:50.

In these molecular miscible blends, suitable second polyketone polymers could be polyketone polymers having difference molecular weights or different melting points from the principle polyketone polymer. For example, a polyketone having a low melting point (prepared from a polyketone having a larger termonomer content) can be added to the primary polyketone to provide a molecularly miscible blend of polyketone and polyvinyl phenol.

Polyvinyl phenols usable in the molecularly miscible polyketone blends preferably have the formula:

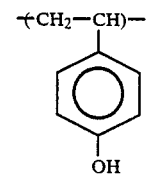

Resin M ™ a p-vinyl phenol polymer available from Maruzen Petrochemical Co. is an example of a suitable polyvinyl phenol usable in the scope of the present invention. Other polyvinyl phenols are contemplated as usable herein include copolymers of vinyl phenols with other styrenic monomers wherein the mole fraction of vinyl phenol is greater than 0.5.

The miscible blend can be prepared by the following process: mixing together the desired parts polyketone; and desired parts second polymer, such as (a second polyketone in powder form). The powders are preferably mixed together in a plastic bag. Drums or tumblers can also be used for mixing and blending of the powders.

The blended powders are then poured into a feeder attached to the 15 mm co-rotating twin screw extruder, such as one made by Baker Perkins. The feed rate can be set at different rates without affecting the resultant product. The extruder can be run at 300 rpm.

The resulting extruded strand is preferably quenched in water at room temperature, then fed into a chopper to form pellets.

Test specimens can be prepared by drying the formed pellets in a vacuum oven at 40° C. for about 8 hours. Pellets are then compression molded into plaques between 5 and 30 mils in thickness at 245° C. for 1½ minutes using for example, a Carver hydraulic press.

Plaques can then be cut into strips for the testing. The results follow.

For tensile strength tests, the plaques were cut into microtensile specimens having a dumbbell shape similar to specimens formed using ASTM D1708 test dies. The specimens described below were tested in a minimaterials test made by Polymer Laboratories.

For DSC testing, samples, typically 5 mm in diameter, punched from the plaque were tested in a Perkin Elmer DSC-7.

Illustrative Molecularly Misicble Blend Formulations

The physical properties of these Formulations are detailed on Table 1 which follows.

Illustrative Embodiment I

Formulation A: (Control)

100% polyketone 087/011

087/011 is a linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane.

Illustrative Embodiment II

Formulation B

80% polyketone 087/011 20% polyvinyl phenol

A blend of the terpolymer of Formulation A and 20% by weight, based on total blend of p-vinyl phenol Resin M ™, marketed by Maruzen Petrochemical Co., was prepared in a the Baker-Perkins extruder. The resulting blend had a uniform appearance. The extrudability of the blend was termed excellent.

The results of the measurements with the blend of this embodiment are shown in Table 1. In Table 1, the temperatures are measured in °C.

Illustrative Embodiment III

Formulation C

60% polyketone 087/011 40% polyvinyl phenol

Blends of polyvinyl phenol were prepared by the procedure of Illustrative Embodiment II with polyketone terpolymers produced by the general procedure of Illustrative Embodiment I. Physical properties of these blends were measured and the results are shown in Table 1.

Illustrative Embodiment IV

Formulation D

40% polyketone 087/011 60% polyvinyl phenol

Blends of polyvinyl phenol were prepared by the procedure of Illustrative Embodiment II with polyketone terpolymers produced by the general procedure of Illustrative Embodiment I. Physical properties of these blends were measured and the results are shown in Table 1.

Illustrative Embodiment V

Formulation E: (Control)

100% polyvinyl phenol

Additional data is provided on these samples in Table 1.

TABLE 1

|   | $Tg^1$ | HF of plaque[2] | % Crystallinity[3] of plaque (overall) | % Crystallinity of Pk[4] Blend | Modulus[5] | Yield[5] Stress | Elongation[5] to Break (%) |
|---|---|---|---|---|---|---|---|
| A | 25 | 20.9 | 38 | 38 | 170,000 | 8800 | 359 |
| B | 55 | 16.3 | 29.7 | 37.2 | 345,000 | 9950 | 109 |
| C | 98 | 9.7 | 17.6 | 29.4 | too brittle | | |
| D | 105 | 0 | 0 | 0 | too brittle | | |
| E | 154 | 0 | 0 | 0 | too brittle | | |

[1]Tg is glass transition temperature of formulation determined by Dynamic mechanical testing using a Polymer Laboratories DMTA.
[2]HF represents heat of fusion of plaque in cal/gram.
[3]% crystallinity calculated on a basis of 55 cal/gm = 100% crystalline
[4]PK represents polyketone 087/011.
[5]Modulus, yield stress and elongation are tensile properties of the resulting blends determined by ASTM test method D1708.

What is claimed is:

1. A molecularly miscible blend of (a) a linear alternating polymer of carbon monoxide and an ethylenically unsaturated hydrocarbon having a melting point in the range of 175° F. to 300° F., a crystallinity in the range of 25% to 80%, and said polymer is of the formula:

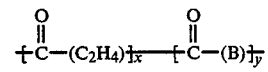

wherein B is the moiety of an ethylenically unsaturated hydrocarbon of at least 3 carbon atoms polymerized through the ethylene unsaturation and the ratio y:x is no more than 0.5 with (b) polyvinyl phenol wherein said components (a) and (b) are blended in relative proportions by weight within a range of from 1:99 and 99:1 parts based on 100 parts of the combined components (a) and (b).

2. A process for preparing molecularly miscible blends of (a) high molecular weight linear alternating interpolymers of carbon monoxide and at least one alpha olefin having from 2 to 8 carbon atoms having a melting point in the range of 175° F. to 300° F., a crystallinity in the range of 25% to 80%, and said polymer is of the formula:

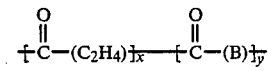

wherein B is the moiety of an ethylenically unsaturated hydrocarbon of at least 3 carbon atoms polymerized through the ethylene unsaturation and the ratio of y:x is no more than 0.5 with (b) a polyyvinyl phenol wherein said process involves the following steps:
  (i) blending 1–99 parts by weight of said (a) interpolymer with 1–99 parts by weight of said (b) polyvinyl phenol based on 100 parts of the combined components (a) and (b);
  (ii) feeding said blend into an extruder;
  (iii) extruding said blended polymer.

3. The blend of claim 1, wherein said linear alternating polymer is of the formula:

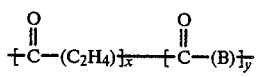

wherein B is the moiety of an ethylenically unsaturated α-olefin of at least 3 carbon atoms polymerized through the ethylenic unsaturation, the ratio of y:x is no more than about 0.5.

4. The blend of claim 1, wherein said linear alternating polymer is of the formula

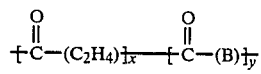

wherein B is the moiety of an ethylenically unsaturated α-olefin of at least 3 carbon atoms polymerized through the ethylenic unsaturation, and wherein group B of said linear alternating polymer is propylene and the ratio of y:x is from about 0.01 to about 0.2.

5. The blend of claim 1, wherein said linear alternating polymer further comprises a second ethylenically unsaturated hydrocarbon.

6. The blend of claim 1, wherein said the polyvinyl phenol is a copolymer of vinyl phenol with a styrene comonomer and wherein the mole fraction of the vinyl phenol is greater than 0.5.

7. The blend of claim 1, wherein y=o.

8. The process of claim 2, wherein y=o.

* * * * *